US006722984B1

(12) United States Patent
Sweeney, Jr. et al.

(10) Patent No.: US 6,722,984 B1
(45) Date of Patent: Apr. 20, 2004

(54) GAME CONTROLLER WITH PARENTAL CONTROL FUNCTIONALITY

(75) Inventors: Kenneth G. Sweeney, Jr., Aliso Viejo, CA (US); Sandro D. Klein, Long Beach, CA (US); William L. Brown, Yorba Linda, CA (US); James N. Conway, Corona del Mar, CA (US)

(73) Assignee: Universal Electronics Inc., Cypress, CA (US)

( * ) Notice: Subject to any disclaimer, the term of this patent is extended or adjusted under 35 U.S.C. 154(b) by 90 days.

(21) Appl. No.: 09/718,983

(22) Filed: Nov. 22, 2000

(51) Int. Cl.⁷ .............................................. G06F 17/00
(52) U.S. Cl. ............................ 463/29; 463/37; 463/39; 341/17 G
(58) Field of Search ............................ 463/37, 34, 39, 463/29; 341/176

(56) References Cited

U.S. PATENT DOCUMENTS

| | | | |
|---|---|---|---|
| 4,484,220 A | * 11/1984 | Beetner | 348/730 |
| 5,046,093 A | * 9/1991 | Wachob | 380/241 |
| 5,046,157 A | * 9/1991 | Smith et al. | 340/309.8 |
| 5,063,484 A | * 11/1991 | Tanaka | 340/825.69 |
| 5,203,848 A | * 4/1993 | Wang | 463/45 |
| 5,255,313 A | 10/1993 | Darbee | |
| 5,259,626 A | * 11/1993 | Ho | 273/148 B |
| 5,317,505 A | * 5/1994 | Karabed et al. | 273/148 B |
| 5,331,353 A | * 7/1994 | Levenson et al. | 725/29 |
| 5,414,426 A | 5/1995 | O'Donnell et al. | |
| 5,515,052 A | 5/1996 | Darbee | |
| 5,531,443 A | 7/1996 | Cruz | |
| 5,654,746 A | * 8/1997 | McMullan et al. | 725/143 |
| 5,700,194 A | * 12/1997 | Hsien | 273/148 B |
| 5,759,100 A | * 6/1998 | Nakanishi | 273/148 B |
| 5,769,719 A | * 6/1998 | Hsu | 273/148 B |
| 5,806,849 A | 9/1998 | Rutkowski | |
| 5,874,906 A | * 2/1999 | Willner et al. | 341/20 |
| 5,900,867 A | * 5/1999 | Schindler et al. | 345/169 |
| 5,959,751 A | 9/1999 | Darbee et al. | |
| 6,071,194 A | 6/2000 | Sanderson | |
| 6,102,802 A | 8/2000 | Armstrong | |
| 6,104,334 A | 8/2000 | Allport | |
| 6,111,569 A | * 8/2000 | Brusky et al. | 345/717 |
| 6,120,025 A | 9/2000 | Hughes, IV | |
| 6,144,367 A | * 11/2000 | Berstis | 340/825.69 |

OTHER PUBLICATIONS

U.S. patent application Ser. No. 09/611,620, Hayes et al., filed Jul. 6, 2000.
U.S. patent application Ser. No. 09/418,091, Young et al., filed Oct. 14, 1999.

* cited by examiner

*Primary Examiner*—Jessica Harrison
*Assistant Examiner*—Corbett B Coburn
(74) *Attorney, Agent, or Firm*—Mark R. Galis; Gary R. Jarosik (57) ABSTRACT

A hand-held controller having a plurality of console command buttons that, in response to activation, cause the transmission of commands for the purpose of controlling the operation of a video game console. Parental control is provided by preventing the transmission of commands to the video game console in response to activation of a console command button as a function of a parental control parameter that is provided to the hand-held controller.

9 Claims, 10 Drawing Sheets

GAME CONTROLLER WITH PARENTAL CONTROL FUNCTIONALITY

FIELD OF THE INVENTION

The present invention relates to hand held controllers. Specific exemplary embodiments discussed relate to game controllers.

BACKGROUND OF THE INVENTION

The description of art in this section is not intended to constitute an admission that any patent, publication or other information referred to herein is "prior art" with respect to this invention, unless specifically designated as such.

Various types of video game machines, video computer systems, computers and the like have been commercially developed for entertainment and education of the user. Exemplary video game machines contemplated by the invention include those manufactured by Sony Corporation under the PLAY STATION brand name, Nintendo Company, Ltd. under the NINTENDO 64 brand name, and Sega Enterprises Ltd. under the SATURN brand name. Additionally, numerous companies provide video game applications for running on personal computers.

Typically the video game machines discussed above include a controller which comprises a housing, action control means, selection control means and a controller wire. The end of the controller wire includes a connector which is engageable with a video game machine. Many of these controllers are of the type having a left section and a right section for holding, with the user's left and right hands, respectively. Other controllers have a left handle section, a center handle section and a right handle section where the user holds two of the sections during operation of the video game.

Figure 3:
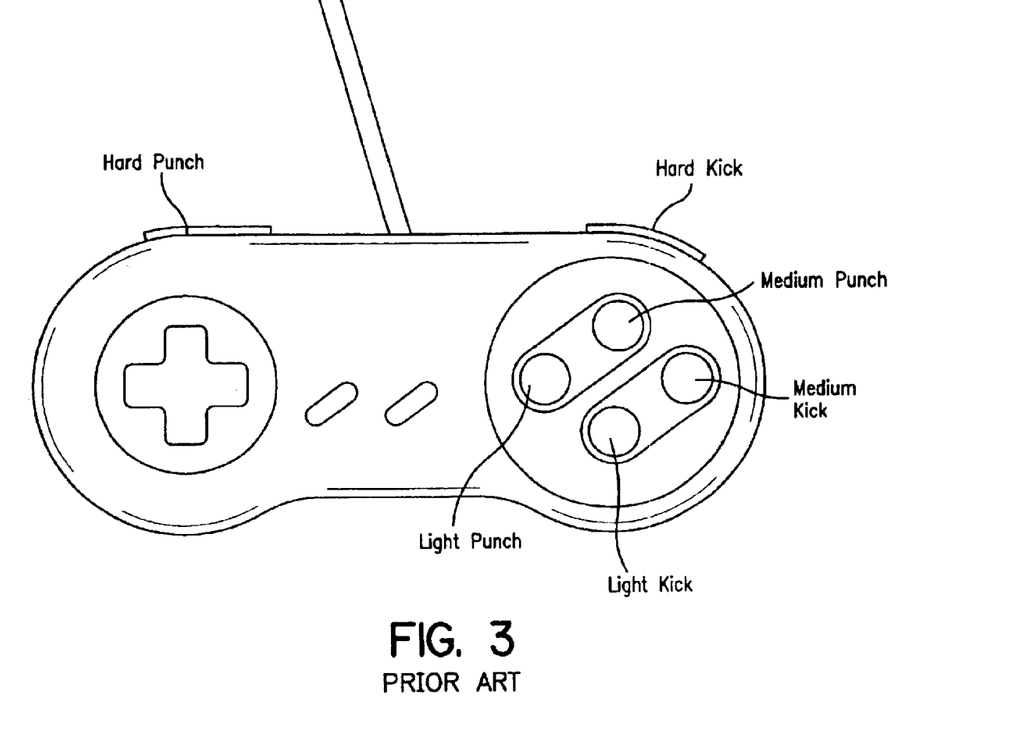
FIG. 3 shows a standard or conventional prior art game controller.
Figure 4:
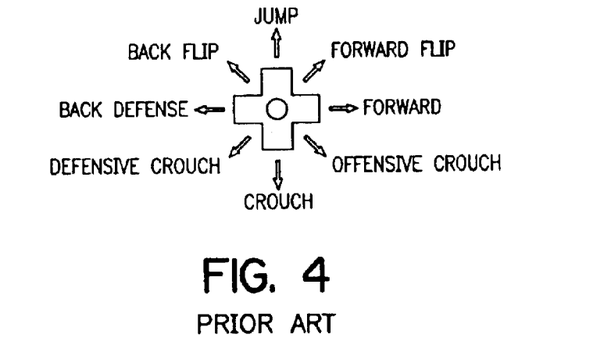
FIG. 4 shows a close-up of the directional controller shown in FIG. 3.

In many video games, special sequences of button presses on the game controller (FIGS. 3-4) are used to cause characters (or other controlled game objects) to perform special actions. As an example, in the STREET FIGHTER II brand video game for the SUPER NINTENDO brand video game console (SNES), the EDMOND HONDA game character can be directed to perform a special move, known as a SUMO HEAD BUTT, by holding down the left arrow button for two seconds and then pressing the right arrow in conjunction with any punch button. Arrow and "punch" buttons are defined in terms of the standard SNES controller, shown in FIGS. 3-4.

The required button press sequences, however, vary from game to game and even from character to character within the same game. For example, the RYU game character in the above-mentioned STREET FIGHTER II brand video game has a different set of special moves that are initiated by different button sequences. The special move key sequence for the RYU game character is not initiated by pressing and holding a button as in the case of the EDMOND HONDA game character, but rather by pressing a series of buttons in rapid succession. Other characters in this game, as well as other games for the SNES and other systems, all have different requirements.

U.S. patents relevant to game controllers include U.S. Pat. Nos. 6,120,025; 6,102,802; 6,071,194; 5,806,849; 5,531,443; and 5,759,100, all of which are incorporated herein by reference.

U.S. Pat. No. 6,120,025 discloses a grip for a controller of a video game machine or video computer system that purportedly reduces slipping of the controller, increases the user's comfort and keeps the user's finger tips in proper alignment during use of the controller.

U.S. Pat. No. 6,102,802 discloses a game controller of the type held in two hands that includes pressure sensitive variable conductance sensors for creating analog signal outputs proportional to varying physical pressure applied to the depressible surface.

U.S. Pat. No. 6,071,194 teaches a reconfigurable video game controller for use with a video game program running on a personal computer platform. The controller may, purportedly, be reconfigured or reprogrammed directly by the user so that user-defined key codes are obtained from a local memory and transmitted to the computer while playing the video game.

U.S. Pat. No. 5,806,849 discloses an electronic game system that includes a console that accepts a game cartridge and runs games stored therein. A wireless controller may be used for controlling actions in the game. The wireless controller includes a radio frequency transmitter for sending control signals to the console. The radio frequencies are used to operate the console when the controller is separated therefrom by large distances.

U.S. Pat. No. 5,531,443 discloses a keypad controller for use with a video game comprising a cable connector mechanism for communication with a video game. A plurality of actuable switches is coupled to the cable mechanism and extends from the controller housing. Each directional switch is associated with a compass direction.

U.S. Pat. No. 5,759,100 discloses a game machine controller which is provided with a memory pack equipped with nonvolatile memory. The memory pack is able to store a plurality of commands designated by a predetermined button operation as command programs. Once the data is stored, it may be retrieved and executed by a simple operation of the command buttons. U.S. Pat. No. 5,759,100 describes a method for programming keystroke sequences which is quite distinct from the normal use of the controller when playing a game. With reference to col. 3 line 65 through col. 5 line 39, this method comprises a manual process in which each key and each space between keys is entered using an LCD prompted editing process (4:43 through 4:55). These entries are then edited to add the desired time duration of each key press and gap between keys (5:19 through 5:39). Besides requiring the user to know (to within two sixtieths of a second) what these time should be, this process is extremely laborious. Also, the exact order of the data entry steps required to program a sequence is hard to determine from the '100 specification. With this in mind, one estimate of the length of time required to store a simple two-key sequence in which one of the keys is pressed and held for, say, one second, is going to require about 30 to 35 keystrokes to program.

U.S. patents and applications relevant to remote control technology include U.S. Pat. Nos. 5,959,751; 5,515,052; 5,414,426; 5,255,313; U.S. patent application Ser. No. 09/418,091, filed Oct. 14, 1999, and U.S. patent application Ser. No. 09/611,620, filed Jul. 6, 2000, all of which are incorporated herein by reference.

U.S. Pat. No. 5,959,751 discloses macro functions and technology for a remote control whereby a user may cause transmission of stored commands upon selection of a single key.

U.S. Pat. No. 5,515,052 discloses a universal remote control with function syntheses. The remote control comprises driver circuitry for communicating code signal generation sequences, including a code generated command system, powered by a code setting signal; and memory for storing information therein.

U.S. Pat. 5,414,426 discloses a favorite key macro command and chained macro command in a remote control. The remote control comprises an entry/definition program and memory for enabling a user of a remote control to define a macro for selecting at least one favorite channel by entry of a series of keystrokes on the keyboard. The remote control includes a playback program in memory for enabling an operator to affect rapid selection of at least one favorite channel of the consumer electronic device to be controlled upon subsequent depression of the macro key.

U.S. Pat. No. 5,255,313 discloses a universal remote control system having a signal generator to transmit signals which will cause specific functions to occur in specific control devices.

U.S. patent application Ser. Nos. 09/418,091, and 09/611,620 disclose means and methods, inter alia, for operating a remote control. Patent application '620 discloses means and methods for interfacing, and navigating with secondary material on a removable digitally encoded medium. The '620 application also teaches means and methods for monitoring keystroke navigation sequences and other processes related to remote control technology.

While the present invention relates to control modules generally, it will be better understood within the discussion of exemplary embodiments directed toward game controllers generally, and combat game controllers specifically.

SUMMARY OF THE INVENTION

Figure 1:
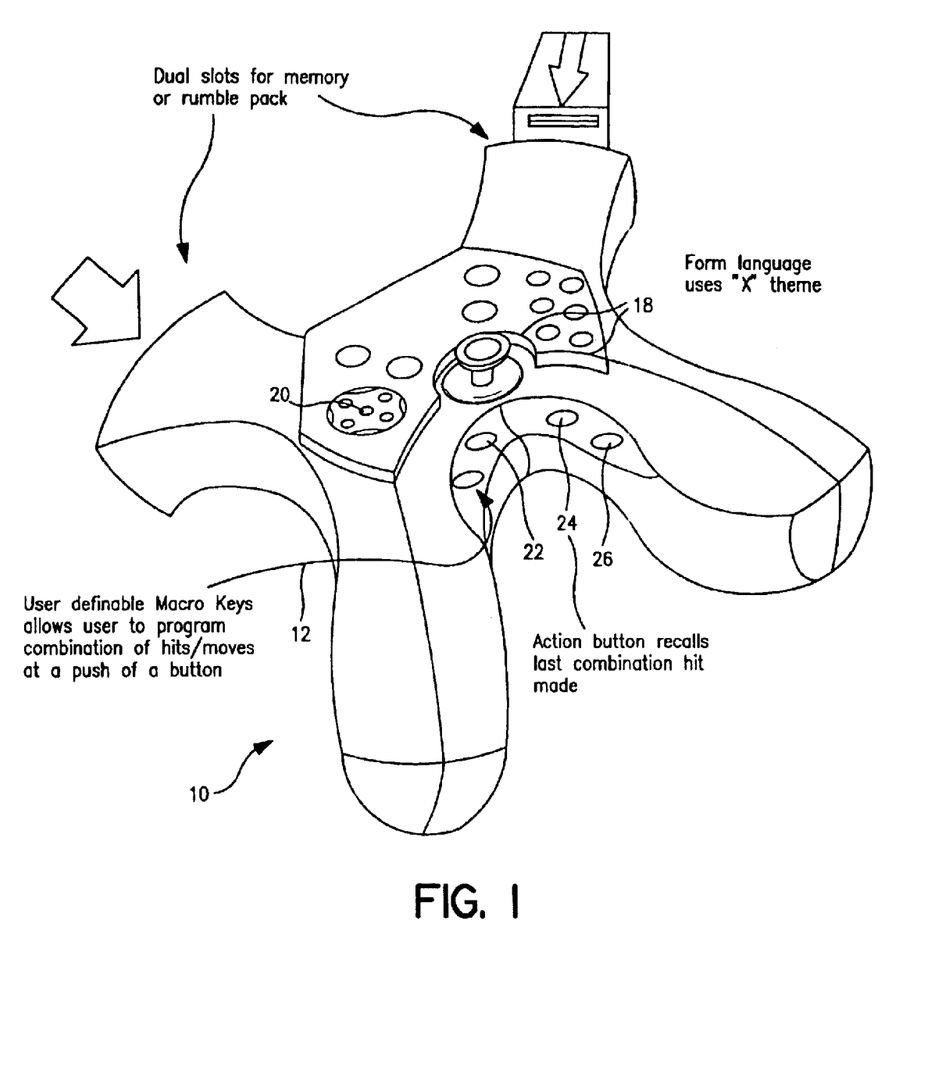
FIG. 1 shows a perspective view of a game controller according to one embodiment of the present invention.
Figure 2:
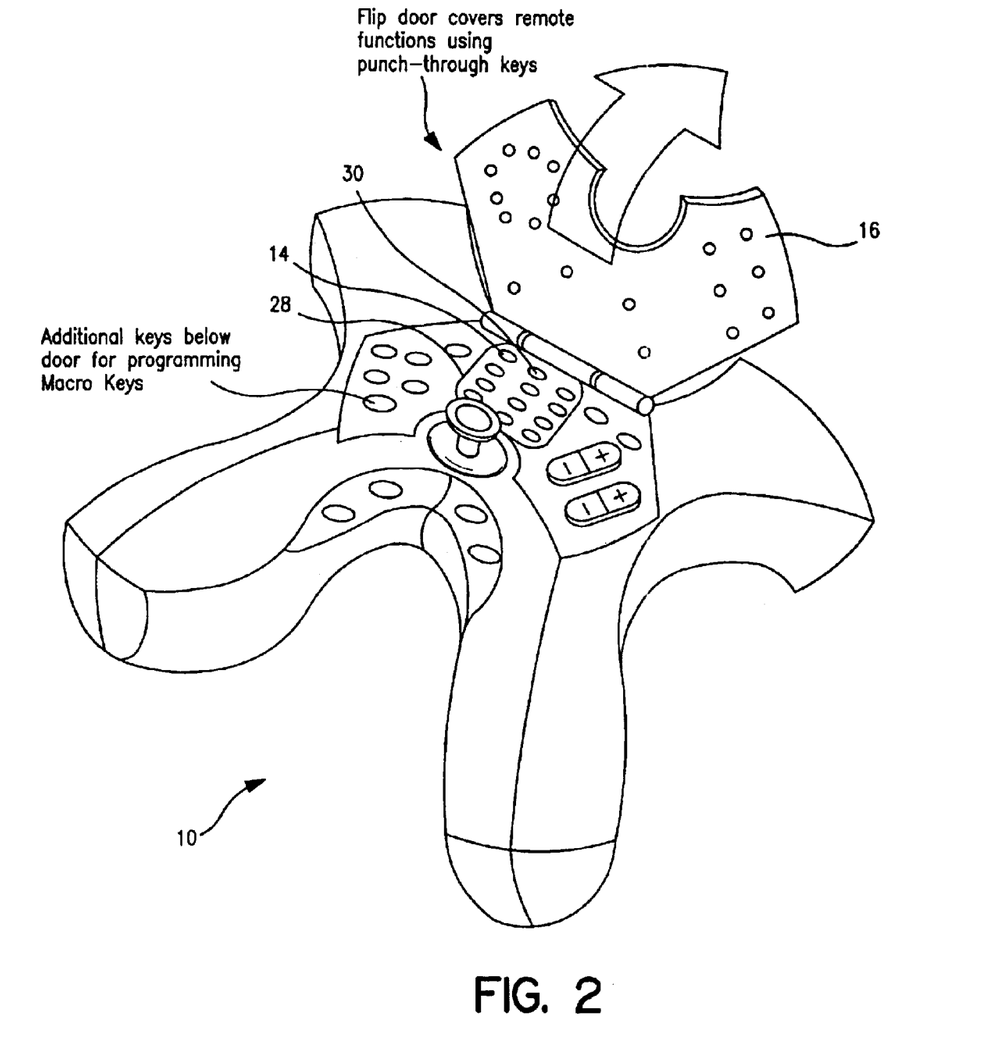
FIG. 2 shows a perspective view of the game controller in FIG. 1 with the flip lid opened to show additional keys.

As the invention is in part directed toward game controllers, one embodiment of the invention is directed toward a game controller that comprises one or more "game macro" buttons that can be easily programmed by the user to perform this type of sequence. One possible implementation of such a controller is shown in FIG. 1 and FIG. 2.

The game controller is preferably adapted to be held by a user for controlling operation of an electronic game. The controller comprises a plurality of user operable keys conveniently positioned for operation by the user while holding the controller. Programming is preferably stored in memory and is responsive to user input for controlling the electronic device. The programming preferably comprises programming for storing a key sequence and a logistic operator associated with at least one key in the key sequence.

The logistic operator may include parameters for the duration the key is operated, e.g., depressed, in interval parameters for measuring the time from when the last key was operated until the present key was operated, or measuring the time from when the present key is operated until the next key is operated. The programming also includes programming for replaying a stored key sequence and accounting for a logistic operator associated with the keys in the stored key sequence.

Generally speaking such programming may be referred to as macro programming. Macro programming has two preferred embodiments. The first preferred macro embodiment comprises initiating a programming routine to store a key sequence for subsequent operation by operating a single button. The second preferred embodiment allows for quick repeat of the last series of commands entered, e.g., a quick-macro.

In a preferred embodiment of the invention, a game controller comprises parental control programming for monitoring and limiting game-play time. Also, preferably included with the conventional game programming is programming associated with the universal remote control. Such universal remote control programming will allow the game controller to operate conventional electronic devices such as televisions, video recorders (video cassette recorders and digital video disks, etc.), cable components, audio components, and personal computers.

More generally, the invention is directed toward computer readable medium adapted for use in a game controller that is adapted to control an electronic game. The media preferably comprises conventional game control programming for controlling the electronic game and macro programming for playing back electronic game control commands. The computer readable medium may, in combination, or alternatively comprise conventional universal remote control programming for controlling an electronic device and/or parental control programming for monitoring and limiting game-play time.

BRIEF DESCRIPTION OF THE DRAWINGS

In the interest of enabling one of skill in the art to practice the invention, exemplary embodiments are shown and described. For clarity, details apparent to those of skill in the art and reproducible without undue experimentation are generally omitted from the drawings and description.

DESCRIPTION OF EXEMPLARY EMBODIMENTS

The present invention is discussed in relation to combat game controllers, however, other uses will be apparent from the teachings disclosed herein. The present invention will be better understood from the following detailed description of exemplary embodiments with reference to the attached drawings, wherein like reference numerals and characters refer to like parts, and by reference to the following claims.

It thus be useful to a player of the above-discussed games to be able to store a sequence of game controller keystrokes and subsequently play them back as needed by pressing a single button. Unlike previously described remote control macro capabilities, playing back these sequences also requires that the duration of each button press be faithfully replicated, together with the intervals between keystrokes.

Referring to FIGS. 1 and 2, one embodiment of the invention is directed toward a game controller that includes one or more "game macro" buttons 12 that can be easily programmed by the user to perform this type of sequence.

The hardware and mechanical implementation of this type of controller, as well as the methods for communicating button press, or operation, data from it to the game console are well known in the art and will not be described further. It should however be noted that the connection between the controller and the console can, in general, be either wired or wireless.

Another feature of this game controller is a "parental setting" which allows the total cumulative time spent in game play to be limited. Another key 14 located under the cover 16 initiates a "parental control" mode in which a password is entered followed by a maximum amount of time that play will be permitted. Depending on the particular implementation of the game controller 10 (e.g., whether it is equipped with a full day/time clock or only with an elapsed time counter), the play time limit could be a single one-time value, a ratio (e.g., for every "x" hours of play time there must be "y" hours of idle time), a renewable daily allocation, or a block of time during specific hours of the day. If supported by the clock provided in the game controller, it is also possible to allow different time allocations to be defined for different days of the week, for example greater playing time on weekends than on week nights. It will also be apparent to those of ordinary skill in the art that in the case of a game controller capable of bi-directional communication with the game console, such time-of-day data may be provided by the host game console rather than built into the game controller unit itself.

The game controller 10 of FIGS. 1 and 2 includes the usual complement of buttons 18 and directional control inputs 20 required for game play, e.g., conventional game keys. It also includes four additional buttons 12, 22, 24, 26, situated conveniently to the user's thumbs, on which user defined sequences of button presses (key sequences or macros) can be programmed. Additionally, the unit has a flip-up door 16 which reveals a second set of keys 28, one of which (30) is used to enter into the macro programming mode and another 14 to enter into the "parental setting" mode. The other keys under the door 16 are connected to conventional universal remote control programming to offer conventional universal remote control functionality to adjust the TV volume or input source, etc., and are not described in further detail. Placement of the key 30 used to enter into the programming mode under the door 16 is preferred to prevent a user from inadvertently entering into the programming mode during heated game play. Other inconvenient positioning of keys 28, including key 30, is sufficient for many applications.

Figure 5A:
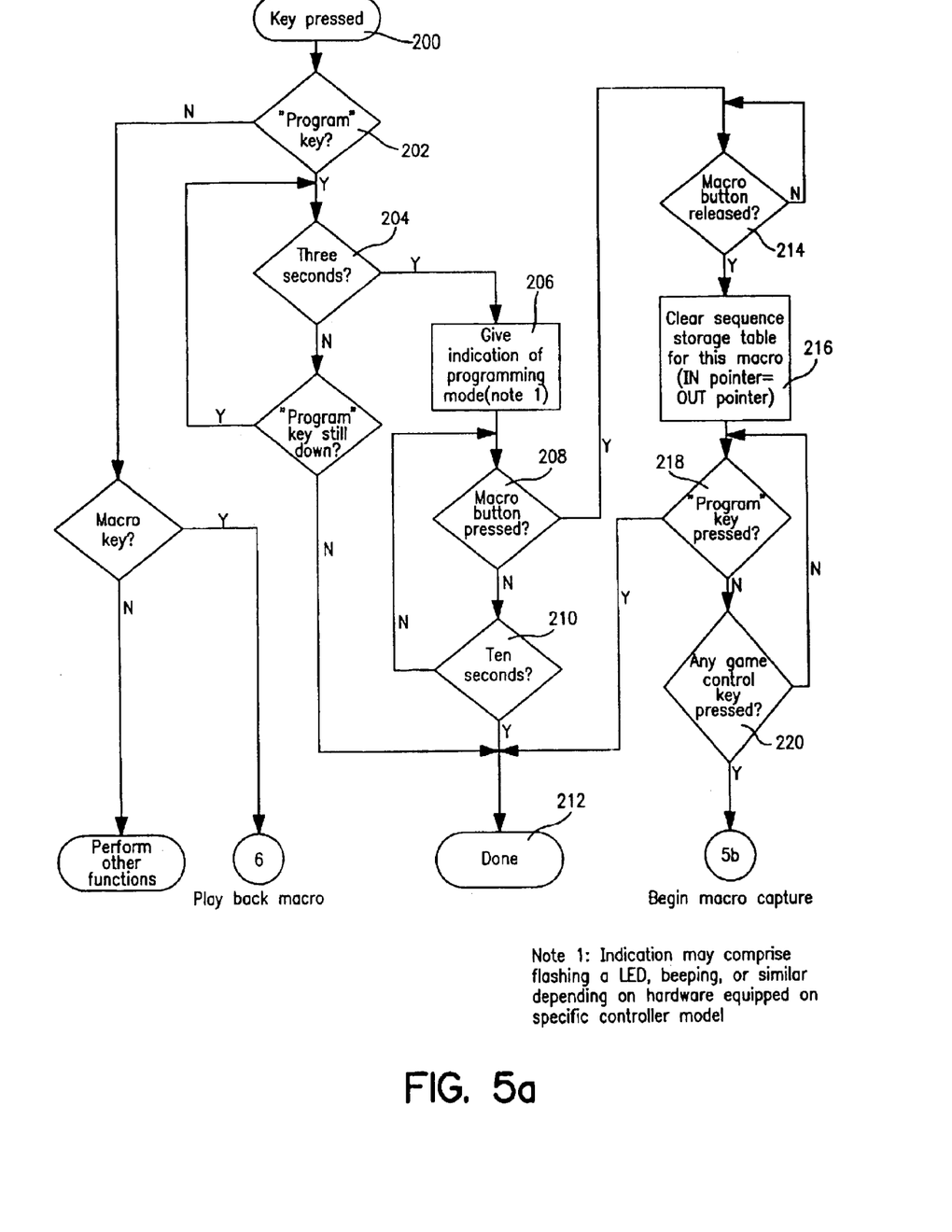
FIG. 5a is a flowchart showing one method for initiating macro programming.
Figure 5B:
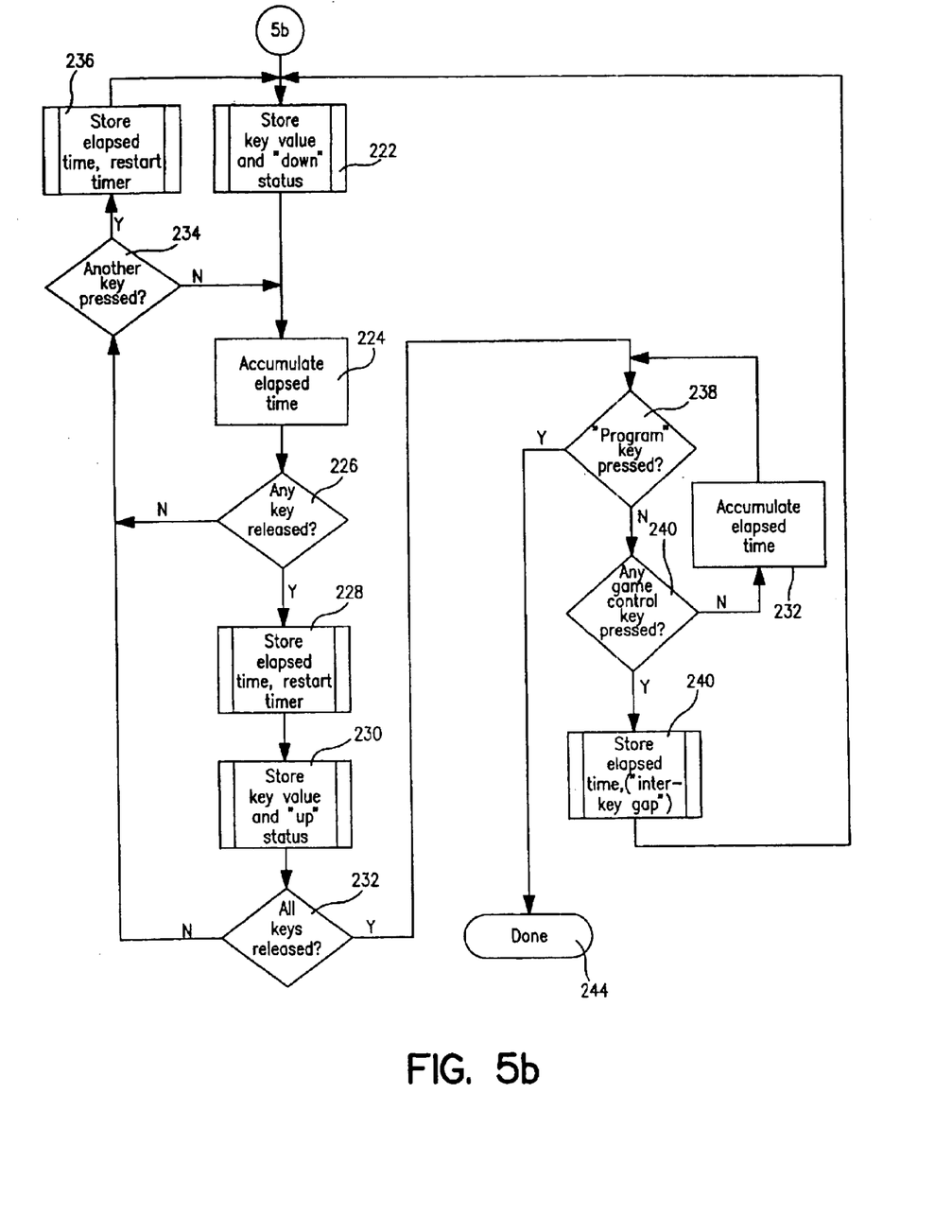
FIG. 5b shows one method for capturing a macro, e.g., a key sequence and associated parameters.

The user steps and method of programming a macro sequence is as shown in FIGS. 5a and 5b. In summary:

The user presses and holds the program key 30 under the lid 16 for a given time interval, for example 3 seconds, to initiate the programming mode. Steps 200–204.

He then closes the lid and presses the macro key (12, 22, 24, or 26) he wishes to program. Step 206. (If no macro key is pressed in 10 seconds, the programming mode is exited. Steps 208–212). Steps 214–220 prepare table 32 (see FIG. 7) to receive macro data. The user then enters the desired button press sequence FIG. 5b.

The button presses are stored by the controller logic, together with the duration of each button press and the intervals between them. This is to allow playback in "real time." Steps 222–224. The duration parameters, interval parameters, intensity parameters (e.g., see U.S. Pat. No. 6,102,802 concerning pressure-sensitive control buttons), for example, may separately and collectively be generally referred to as logistic operators. A given logistic operator is generally associated with a given key in a key sequence.

On completion, the user presses the program button 30 a second time to exit the programming mode. Steps 238–244. Note that pressing key 30 immediately after the macro button has the effect of deleting the existing macro, i.e. leaving that key blank. This may be desirable to a player who for example has passed a certain level and has no further need for a particular sequence but wants to avoid inadvertently triggering it.

An additional capability which may be included in the controller is the storage of multiple sets of macro sequences, each associated with a particular game. In this case, additional keys under lid 16 are used to indicate at the outset of a gaming session which game cartridge or disk is installed in the game console, or game is transmitted to the game console/monitor. Selecting the macro selection keys consequently determines which set, or sets, of stored macros (operation sequences) are to be used. Thus, for example, if four keys under cover 16 were provided labeled "Game 1", "Game 2", and so on, a game player switching back and forth between games would be able to pre-program up to four sets of macro sequences for use with four different games. If the game controller is of the type capable of two-way communication with the game console, the macro set selection could be automatic. In one embodiment, the controller, in communication with the game console, could automatically select the macro set to be used by, for example, matching the game currently installed against those that were installed when each set of macro sequences was originally programmed.

Referring to FIGS. 5b and 7, it can be seen that the macro data is stored in table 32 (in memory, which may be removable), in the general form: <key1 down>, <time1>, <key2 down>, <time2>, . . . , <key n down>, <time n>, <key1 up>, <time 1+n>, <key2 up>, <time 2+n>, . . . and so on. The purpose of using this format, in which key "down" (e.g., 34) and key "up," (e.g., 36) events are individually recorded along with the time intervals (e.g., 38 and 40) between each event, is to permit faithful reproduction of the exact real-time key sequence during playback. This faithful reproduction accounts for overlapping of button presses (e.g. 42–46) (sometimes referred to as "combination presses", or "chording") together with duration of each key operated. Note that "gap" times, or intervals during which no buttons are active, are also recorded. Steps 240–242. The programming of the present invention, in contrast to that disclosed in U.S. Pat. No. 5,759,100, merely requires that user simply press the keys in the normal way, i.e. in real-time, as if he were playing the game. The methods taught in U.S. Pat. No. 5,759,100 are quite laborious in comparison to method of the present invention that achieve real-time programming. Further, the controller 10 automatically captures not only the keys depressed, but also key press duration, gap time between keys, and any chording that occurs, (e.g., a logistic operator associated with the depressed key).

In connection with the real-time nature of the macro programming method of this invention, it may be advantageous to exclude the game controller keystroke used to enter/exit the "pause" state from the capture and storage process. The object of this exclusion is to allow a player to program a sequence by using actual real-time game play. For example, this exclusion allows playing to a point where the special sequence is needed, pausing the game to allow the controller to be put into programming mode, and then resuming the game and capturing the subsequent controller keystrokes. It will be appreciated that in this case, the keystroke storage functions shown at FIG. 5*b* steps 222 and 230 will also include transmitting the button press action to the game console in the usual manner.

Figure 6:
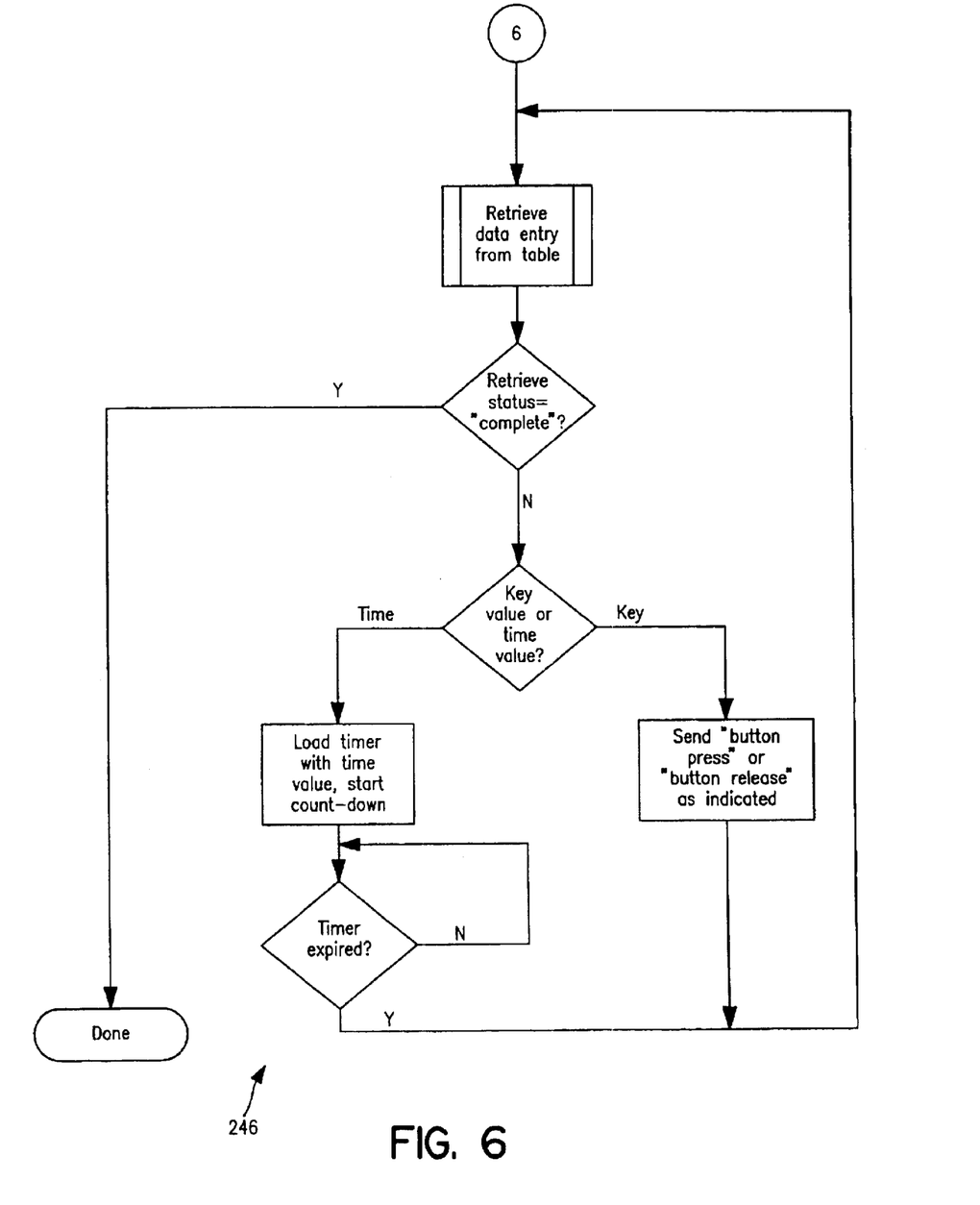
FIG. 6 shows a flowchart for one method of carrying out playback of a macro.
Figure 7A:
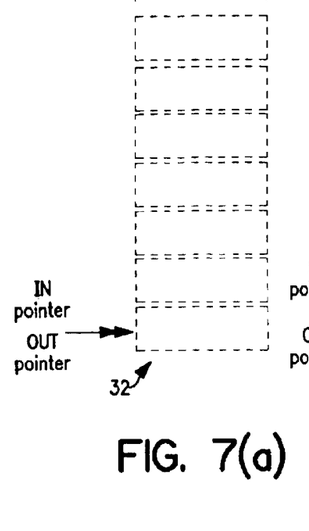
FIG. 7 shows how a table in memory may be used for storing key sequences and associated parameters during a stored sequence when the end pointer is moved to a new entry position in the table.
Figure 7B:
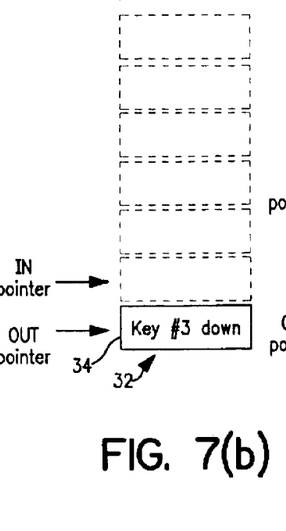
Figure 7C:
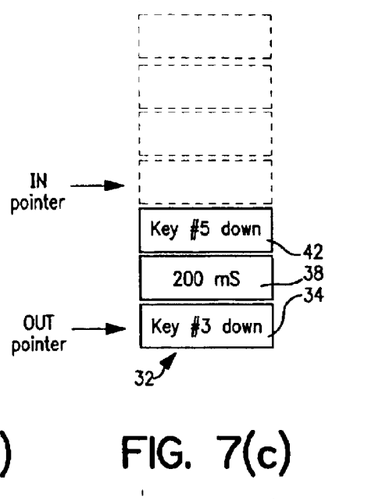
Figures 7D, 7E, 7F:
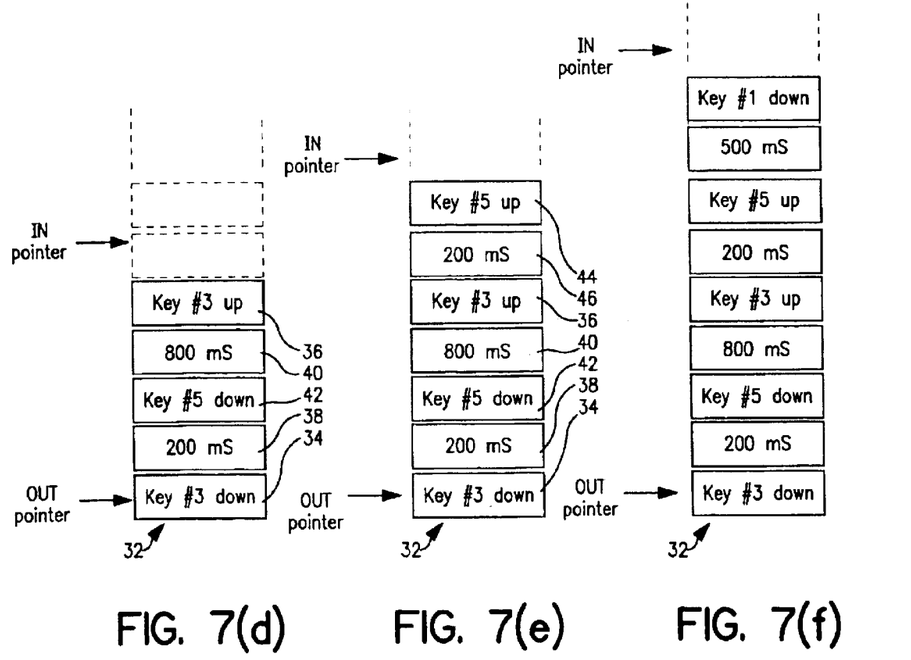
Figure 8:
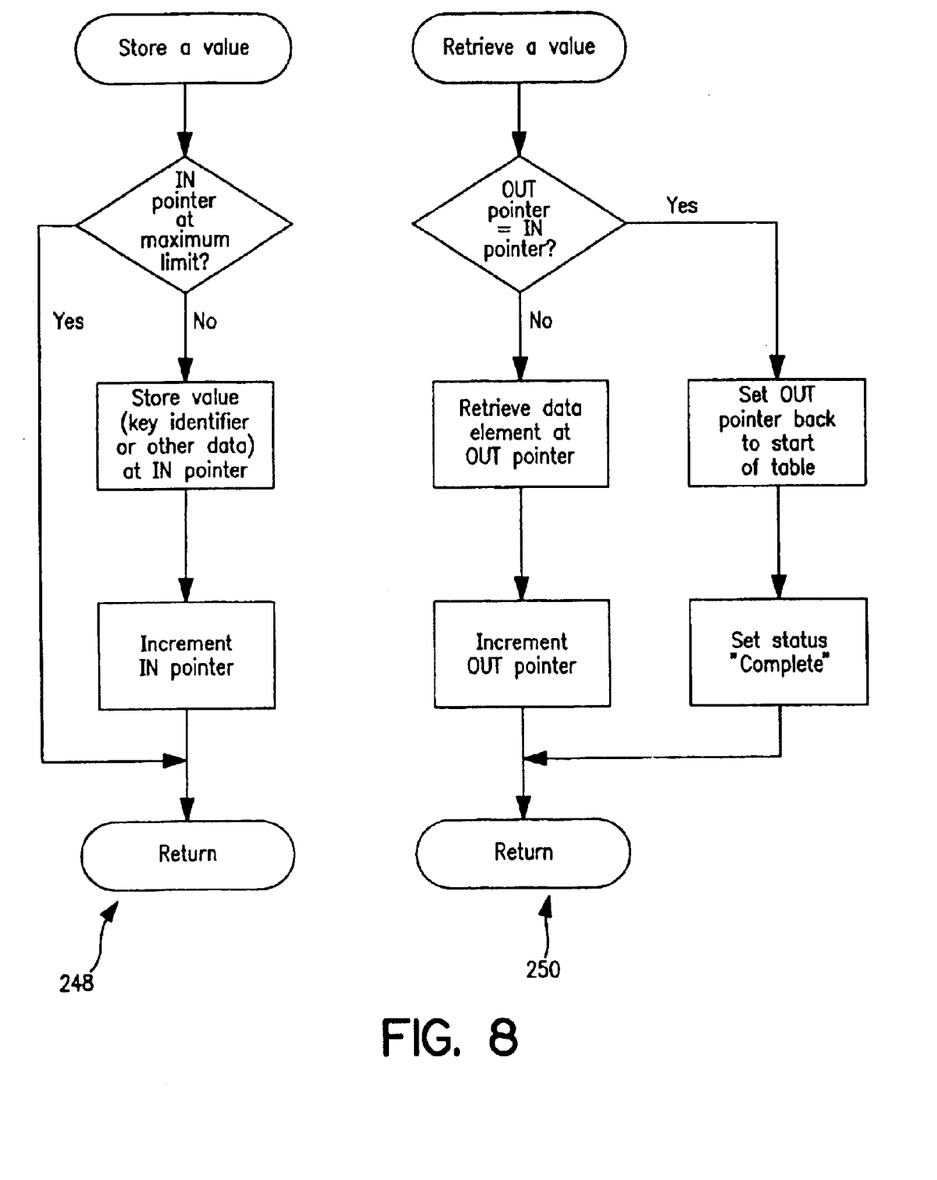
FIG. 8 shows flowcharts for carrying out data storage retrieval.

A method 246 of playing back a macro is shown diagrammatically in FIG. 6. This is essentially the inverse of the storage process described above, with all timings faithfully replicated. FIG. 7, for reference, shows a data structure used to store key sequence data, while FIG. 8 shows the algorithms used for storing 248 and retrieving 250 the data elements.

Figure 9:
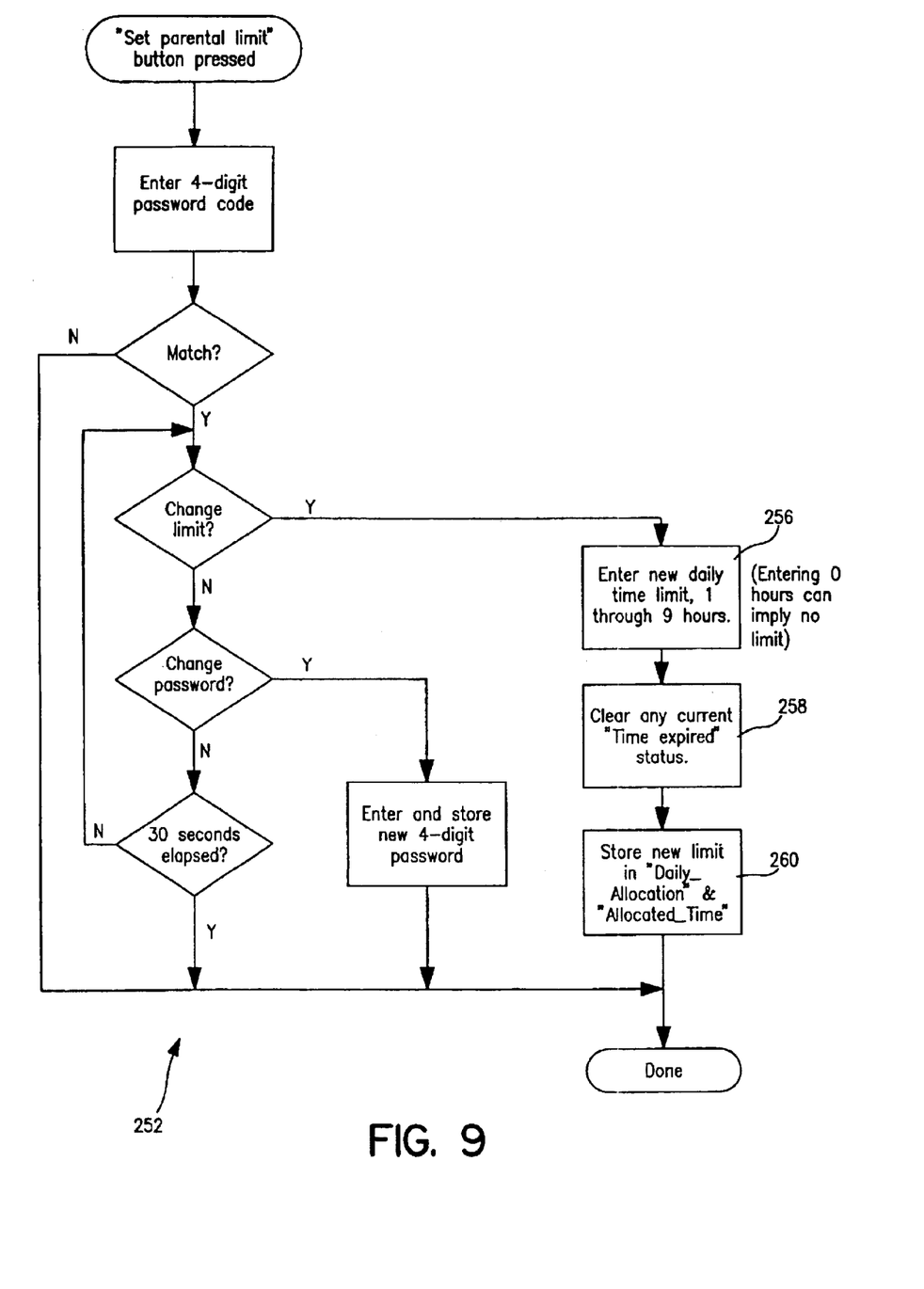
FIG. 9 shows a method of setting a parental limit.
Figure 10:
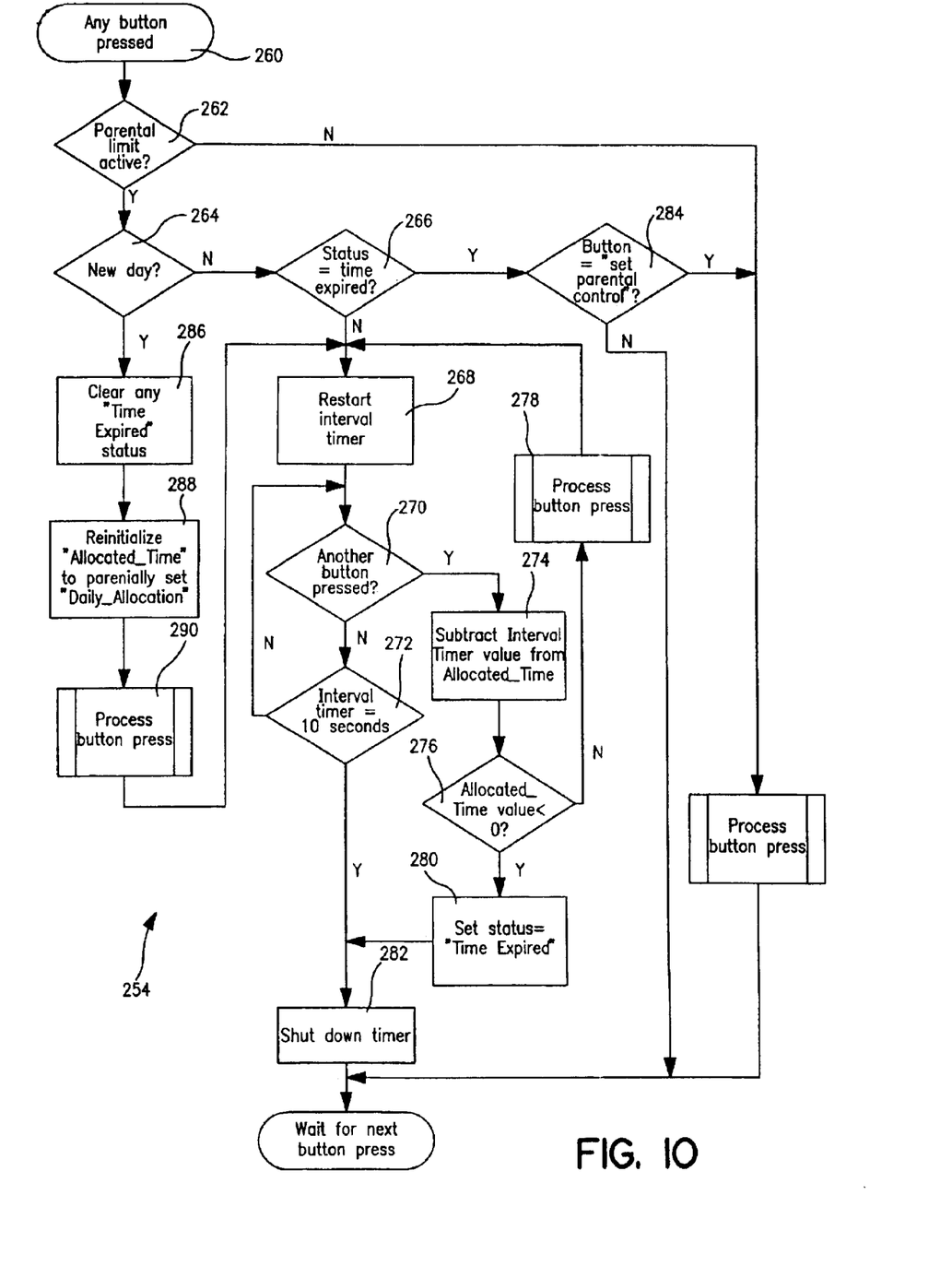
FIG. 10 shows a flowchart comprising programming logic for activating parental control.

FIGS. 9 and 10 show one possible implementation of a parental time limit feature including setting a parental limit flowchart 252 and monitoring and limiting play time flowchart 254. In this example, the limit is expressed as a maximum number of hours per day that the game controller 10 may be used. Steps 256–260. The controller counts down the time that it is actively in use via an algorithm that assumes that a 10-second period without any button press activity means that the unit is no longer active. Steps 266–282. The cumulative duration of all button press activity within the 10-second window is subtracted from the parentally set limit value. Steps 274–276. When this value reaches zero, the controller no longer responds to button presses 280–282 (except the "set limit" button itself, thus allowing a person in possession of the password to reset the limit if desired. Step 284.) At the start of each new day, the daily limit value is automatically reinstated to the parentally set value. Steps 264, 286–288. In this implementation, the game controller 10 is necessarily configured to measure 24-hour periods in order to measure the passage of days. It will be appreciated that other implementations are possible, both simpler and more complex, ranging from no automatic reinstatement at all (the parent sets each new allocation as a one time value) through complex systems which take into account time of day and/or day of week. In certain embodiments, it may be desirable to provide a "warning" signal such as a beep or a flashing LED a short interval prior to complete expiration of the limit value. This warning, thus provides the user time to perform whatever steps may be required to achieve a "graceful exit"—for example, saving the current game. As will be appreciated by those of ordinary skill in the art, this can easily be achieved by insertion of an additional level of check between steps 274 and 276. In yet another embodiment, a small LCD display could be provided on the controller to show remaining time allocation. In this embodiment, such a display could also be used as a supplementary indicator of game status (ammunition remaining, etc.) in the case where the controller is in two-way communication with the game console.

Selected exemplary embodiments of the invention will now be described with particularity.

FIGS. 1 and 2 show a game controller 10 adapted to be held by a user for controlling operation of an electronic game device. The controller 10 comprises a plurality of user operable keys 18, 12, 22–26, conveniently positioned for operation by a user while holding the controller 10. Conventional gaming keys, some of which are positioned beneath the lid 16, are associated with conventional gaming functions. The gaming keys positioned beneath the lid 16 are operable while the lid 16 is closed through use of punch-through keys. The controller 10 comprises programming responsive to user inputs for controlling the electronic game device. The programming preferably comprises programming for storing a key sequence and a logistic operator associated with at least one key in the key sequence and programming for replaying a stored key sequence in accounting for logistic operators associated with the stored keys. The controller may comprise removable memory for storing the sequence and associated logistic operator, or integrated memory for the same.

In a preferred embodiment, the logistic operator associated with each key in the key sequence includes a duration parameter and an interval parameter. The macro keys 12, 22, 24, 26 shown in FIG. 1 are conveniently positioned for operation by a user's thumb while operating the controller 10 to control the electronic game device. Thus the user may replay stored key sequences, on a real-time basis, accounting for logistic operators associated with each key sequence. The macro key 12 may be programmed by use of a program key 30 inconveniently positioned under the door 16 whereby such inconvenient positioning avoids inadvertently entering of the program mode. In some embodiments, a quick macro key, also referred to as an action key, may be used for replaying the last combination of keys entered. Generally the macro key, quick macro, and action key are referred to collectively and individually as macro keys.

FIG. 2 shows a plurality of additional keys 28, including conventional universal remote control keys, under the flip door 16. The universal remote control keys are associate with conventional remote control programming for controlling an electronic device, wherein such device is selected from a group consisting of television, a video recorder, and audio component, a cable component, and a personal computer, for example. Also positioned under the flip door 16 is parental control key 14 for programming parental control programming. The parental control programming provides for monitoring and limiting game-play time.

In some applications a game controller, adapted to control an electronic game, is provided with removable, or preferably integrated computer readable medium. The computer readable medium may comprise conventional game control programming for controlling the electronic game and macro programming for playing back electronic game control commands. The macro control programming may, preferably, comprise macro capture programming for storing a key sequence and associated plurality of logistic operators associated with the key sequence and macro playback programming for playing back a stored key sequence and a stored associated plurality of logistic operators associated with the stored key sequence. For some applications, the computer readable medium comprises parental control programming for monitoring and limiting game-play time. For other applications, a computer readable medium is provided with conventional game control programming for controlling the electronic game in conventional universal remote control programming for controlling an electronic game device, whereby a game controller comprising the computer readable medium may control both an electronic game and a separate electronic device.

While the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

The invention claimed is:

1. A controller for use in connection with a video game console, comprising:
    a hand-held casing adapted for use in spaced relation with respect to the video game console having:
        a plurality of console command buttons activatable to cause the transmission of commands to the video game console, the commands controlling actions of a game object of a video game playable on the video game console; and
        parental control programming comprising instructions for accepting a parental control parameter and for preventing the controller from responding to activation of a console command button as a function of the parental control parameter to thereby prevent a transmission to the video game console of a command for controlling an action of a game object by means of activation of a console command button.

2. The controller as recited in claim 1, wherein the hand-held casing further has a plurality of appliance command buttons activatable to cause the transmission of commands to control the operation of a home appliance.

3. The controller as recited in claim 1, wherein the parental control parameter defines a period of time and the parental control programming comprises instructions for preventing the controller from responding to activation of a console command button when the cumulative time of operation of the controller exceeds the defined period of time.

4. The controller as recited in claim 3, wherein the period of time is uniquely definable for each day of the week.

5. The controller as recited in claim 3, wherein the parental control programming comprises instructions for monitoring activation of the console command buttons for determining the cumulative time of operation of the controller.

6. The controller as recited in claim 3, wherein the hand-held casing further has a display and the parental control programming comprises instructions for presenting in the display an indication as to when the cumulative time of operation of the controller will exceed the defined period of time.

7. The controller as recited in claim 3, wherein access to the parental control programming is password protected.

8. The controller as recited in claim 1, wherein the parental control parameter comprises a time of day.

9. The controller as recited in claim 8, wherein the time of day is definable for different days of a week.

* * * * *